United States Patent
Kondo et al.

(10) Patent No.: US 8,531,760 B2
(45) Date of Patent: Sep. 10, 2013

(54) SEMICONDUCTOR WAVELENGTH CONVERTING DEVICES AND LIGHT SOURCES FOR GENERATING INFRARED RAYS

(71) Applicant: NGK Insulators, Ltd., Aichi-prefecture (JP)

(72) Inventors: Jungo Kondo, Miyoshi (JP); Yuichi Iwata, Nagoya (JP); Tetsuya Ejiri, Kasugai (JP)

(73) Assignee: NGK Insulators, Ltd., Aichi-prefecture (JP)

( * ) Notice: Subject to any disclaimer, the term of this patent is extended or adjusted under 35 U.S.C. 154(b) by 0 days.

(21) Appl. No.: 13/713,132

(22) Filed: Dec. 13, 2012

(65) Prior Publication Data

US 2013/0156062 A1    Jun. 20, 2013

(30) Foreign Application Priority Data

Dec. 19, 2011   (JP) ................................ 2011-276962

(51) Int. Cl.
*G02F 1/35* (2006.01)
*G02F 2/02* (2006.01)

(52) U.S. Cl.
USPC ............... 359/330; 372/22; 372/34; 359/326

(58) Field of Classification Search
USPC .................. 359/326–332; 372/21–22, 34–36
See application file for complete search history.

(56) References Cited

U.S. PATENT DOCUMENTS

| | | | |
|---|---|---|---|
| 6,273,949 B1 | 8/2001 | Eyres et al. | |
| 7,372,621 B2 * | 5/2008 | Yoshino et al. | 359/326 |
| 7,710,638 B2 * | 5/2010 | Yoshino | 359/332 |
| 8,184,360 B2 * | 5/2012 | Yoshino | 359/328 |
| 8,384,989 B2 * | 2/2013 | Kondo et al. | 359/330 |

FOREIGN PATENT DOCUMENTS

JP   2001183713 A * 7/2001

OTHER PUBLICATIONS

Eyres, L.A., et al., "All-epitaxial fabrication of thick, orientatio-patterned GaAs films for nonlinear optical frequency conversion," Appl. Phys. Lett. 2001, vol. 79, No. 7, pp. 904-906.

(Continued)

*Primary Examiner* — Daniel Petkovsek
(74) *Attorney, Agent, or Firm* — Cermak Nakajima LLP; Tomoko Nakajima (57) ABSTRACT

It is provided a wavelength converting device oscillating an idler light having a wavelength of 5 to 10 μm from a pump light. The wavelength of the idler light is longer than that of the pump light. The wavelength converting device includes a wavelength converting layer 5 of a semiconductor non-linear optical crystal and having a thickness of 50 μm or smaller. The wavelength converting layer 5 includes a crystal orientation inversion structure wherein crystal orientation of the optical crystal is inverted at a predetermined period and at least one flat main face 5b. The device further includes a Peltier device 2 controlling a temperature of the wavelength converting layer 5; and a clad portion 4 joined with the flat main face 5b of the wavelength converting layer 5 and provided between the wavelength converting layer 5 and the Peltier device 2. The pump light, idler light and signal light satisfies a particular phase matching condition.

10 Claims, 10 Drawing Sheets

(56) References Cited

OTHER PUBLICATIONS

Yu, X., "MBE Growth of III-V Materials With Orientation-Patterned Structures for Nonlinear Optics," A Dissertation Submitted to the Department of Materials Science and Engineering and the Committee on Graduate Studies of Stanford University in Partial Fulfillment of the Requirements for the Degree of Doctor of Philosophy, Mar. 2006.

Pinguet, T. J., "Orientation-Patterned Gallium Arsenide for Quais0Phasematched Infrared Nonlinear Optics," A Dissertation Submitted to the Department of Applied Physics and the Committee on Graduate Studies of Stanford University in Partial Fulfillment of the Requirements for the Degree of Doctor of Philosophy, Mar. 2002.

* cited by examiner

Fig. 1

$$(np/\lambda p) = (ns/\lambda s) + (ni/\lambda i) + (1/\Lambda)$$

OP-GaAs QPM period and temperature tuning can be accurately predicted

SEMICONDUCTOR WAVELENGTH CONVERTING DEVICES AND LIGHT SOURCES FOR GENERATING INFRARED RAYS

This application claims the benefit of Japanese Patent Application No. P2011-276962 filed on Dec. 19, 2011, the entirety of which is incorporated by reference.

TECHNICAL FIELD

The present invention relates to semiconductor wavelength conversion devices and light sources for generating infrared rays.

BACKGROUND ARTS

Mid- and far-infrared rays in a band of wavelengths of 5 to 10 μm shows strong absorption peaks corresponding to those of various gases and living cells, so that such rays draw attention in applications of measurement and analysis based on infrared ray spectroscopy. It is, however, necessary to scan in a range of wavelengths near absorption peaks of gases or the like for performing infrared ray spectroscopy. It is thus required a light source for 5 GHz or lower whose line width of spectrum is narrow and wavelength is tunable.

Although semiconductor lasers have been widely applied for gas analysis in near-infrared spectroscopy, they can be applied in a range of wavelength of 3 μm at most and cannot be applied in mid- and far-infrared ray spectroscopy.

Although quantum cascade laser can oscillate light in a range of mid-infrared rays to terahertz lights and expected in the related applications, it is difficult to realize a wavelength tunable laser and to utilize the laser in applications of spectroscopy.

On the other hand, according to systems of wavelength conversion, it is used a device utilizing quasi-phase matching (QPM) made of a material such as lithium niobate, so that it is possible to convert the wavelength from near-infrared range to mid-infrared range utilizing difference frequency or parametric generation. It is, however, difficult to generate converted radiation having a wavelength of 4.5 μm or higher due to absorption of infrared rays in the material.

On the other hand, semiconductors such as GaAs and ZnSe transmit radiations having a wavelength of 1 to 10 μm. Further, as described in Non-Patent Reference 1, it is possible to produce a QPM device (OP-GaAs: Orientation Patterned GaAs) whose crystal orientation is inverted during its crystal growth.

Figure 1:
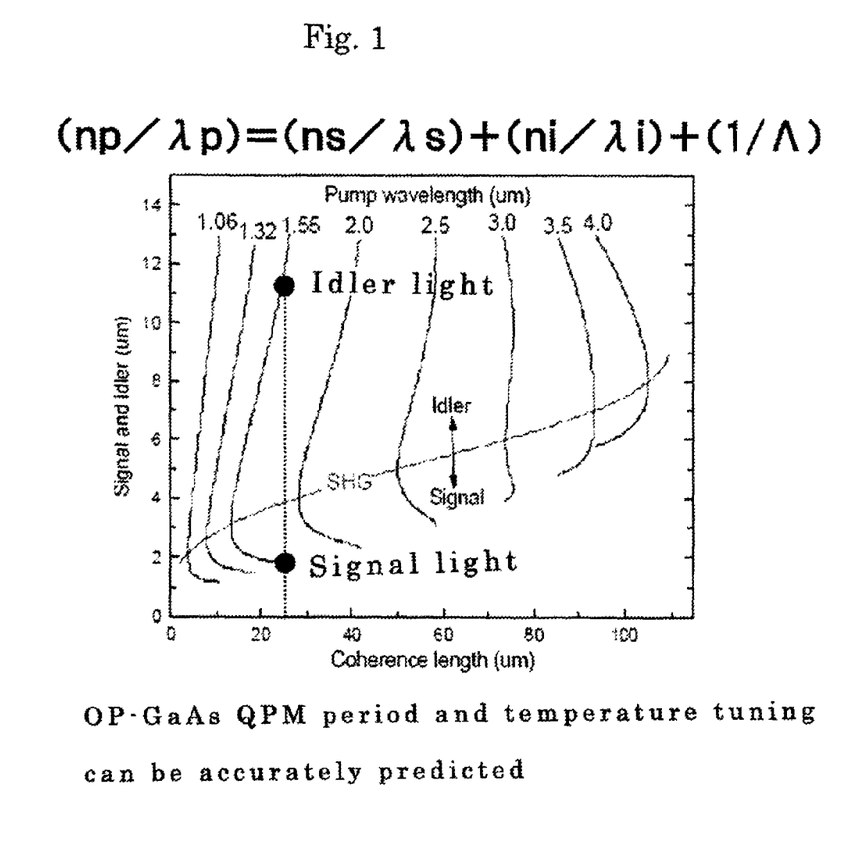
FIG. 1 is a graph showing a phase matching wavelength of each light for an OP-GaAs device.

Then, the phase matching characteristics of the above described OP-GaAs is shown in FIG. 1. An inversion period Λ is two fold of a coherence length. It is proved to be possible to convert pump lights of wavelengths of 1 to 4 μm to infrared rays of wavelengths of 2 to 10 μm, by appropriately adjusting the inversion period Λ. Here, in formula shown in FIG. 1, "np" represents a refractive index of the OP-GaAs with respect to the pump light, "λp" represents a wavelength of the pump light, "ns" represents a refractive index of the OP-GaAs with respect to a signal light, "λs" represents a wavelength of the signal light, "ni" represents a refractive index of the OP-GaAs with respect to an idler light, and "λi" represents a wavelength of the idler light.

They are known two kinds of systems generating idler light in such devices. First, pump and signal lights are made incident into a bulk-type OP-GaAs device to irradiate an idler light. However, the conversion rate is low so that it is required to increase the intensity of the incident light. It is therefore necessary to make both of the pump and signal lights are made incident as CW lights to amplify them by means of optical fiber amplifiers.

Second, it is known to make a pump light incident into a bulk-type OP-GaAs device to generate idler and signal lights based on parametric generation (Non-Patent Reference 2). However, the conversion rate is low so that it is required to increase the intensity of the incident light. A pulse laser is thereby used as the pump light to increase the peak intensity and to improve the conversion efficiency.

Figure 2:
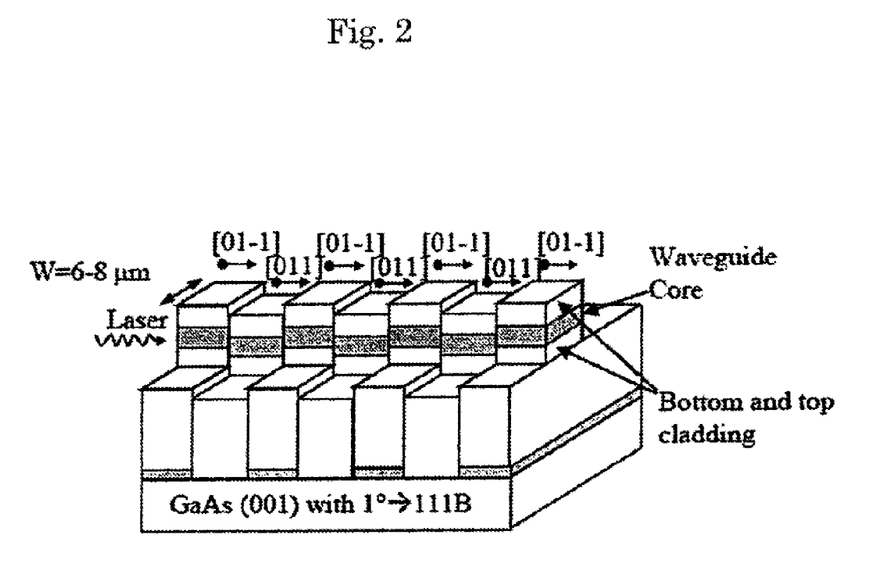
FIG. 2 is a diagram schematically showing a wavelength converting device whose core is produced by a semiconductor process.

It is described, in the Patent Reference 2, a typical waveguide structure of an OP-GaAs device. In the case of such type of semiconductor device, its optical waveguide is of a ridge type. For example as shown in FIG. 2, light is laterally confined by the ridge shape. Further, in the direction of the depth of the ridge waveguide, the mixing ratio of Al is changed to form a core and clad layers are formed over and under the core, respectively to realize the confinement of the light in the direction of the depth. For example, the core of Al 67 percent is formed in the direction of depth.

On the other hand, as a GaAs device having QPM structure, it is known a bulk-type device, for example, having a thickness of 500 μm
(Patent Reference 1).

Further, an infrared ray generating system by Stanford University was disclosed in Non-Patent Reference 3.
(Patent Reference 1)
U.S. Pat. No. 6,273,949.
(Non-Patent Reference 1)
L. A. Eyres, et. al., "All-epitaxial fabrication of thick, orientation-patterned GaAs films for nonlinear optical frequency conversion" Appl. Phys. Lett., Vol. 79, No. 7, Aug. 13, 2001
(Non-Patent Reference 2)
Xiaojun Yu, "MBE GROWTH OF III-V MATERIALS WITH ORIENTATION-PATTERNED STRUCTURES FOR NONLINEAR OPTICS",
A DISSERTATION SUBMITTED TO THE DEPARTMENT OF MATERIALS SCIENCE AND ENGINEERING AND THE COMMITTEE ON GRADUATE STUDIES OF STANFORD UNIVERSITY, IN PARTIAL FULFILLMENT OF THE REQUIREMENTS FOR THE DEGREE OF DOCTOR OF PHILOSOPHY, March 2006)
(Non-Patent Reference 3)
Thierry Jacques Pinguet, "ORIENTATION-PATTERNED GALLIUM ARSENIDE FOR QUASI-PHASE-MATCHED INFRARED NONLINEAR OPTICS",
A DISSERTATION SUBMITTED TO THE DEPARTMENT OF APPLIED PHYSICS AND THE COMMITTEE ON GRADUATE STUDIES OF STANFORD UNIVERSITY IN PARTIAL FULFILLMENT OF THE REQUIREMENTS FOR THE DEGREE OF DOCTOR OF PHILOSOPHY, March 2002

SUMMARY OF THE INVENTION

However, after the ridge type optical waveguide including QPM is produced by semiconductor process, it is observed roughness in its core portion. The propagation loss is thereby inevitably increased. As described above, although the OP-GaAs has considerable potential as the wavelength converting device generating mid- and far infrared rays, it is difficult to provide an optical waveguide of a low loss. It is thus indispensable to utilize a pulse laser operating on sub-nano seconds level or an optical fiber amplifier, for improving the power intensity of the incident light to realize a high conversion efficiency.

On the other hand, in the case of a bulk type device composed of a thick plate utilizing GaAs, it is applied a bulk-type device, for example having a thickness of 500 μm. In this case, a pump light is condensed by a lens to provide a spot size of 100 to 200 μm in the bulk. Therefore, in the case that an idler light having a wavelength of 5 μm or higher is generated, the spot size is increased more than twice and 200 μm or larger. In the case of wavelength tuning, its temperature is controlled in a range of 20 to 150° C. for preventing condensation on the device.

The inventors have tried to utilize a semiconductor wavelength converting device such as GaAs to tune the phase matching wavelength by temperature control. It is, however, found that the line width of spectrum is widened to result in a reduction of output power. Actually, in the case that the temperature distribution in the spot size is 0.4° C. or higher, it was found that the spectrum line width of the idler light obtained by the wavelength conversion exceeded 5 GHz.

An object of the present invention is to provide a wavelength converting structure capable of generating, in tunable manner, mid- or far infrared light in a wavelength range of 5 to 10 μm at a high output power and narrow spectrum line width, without applying an optical fiber amplifier or a pulse laser.

The present invention provides a wavelength converting device generating an idler light having a wavelength of 5 to 10 μm from a pump light, the wavelength of the idler light being longer than that of the pump light. The wavelength converting device includes:

a wavelength converting layer including a semiconductor non-linear optical crystal and having a thickness of 50 μm or smaller, the wavelength converting layer comprising a crystal orientation inversion structure wherein crystal orientation of the optical crystal is inverted at a predetermined period and at least one flat main face;

a Peltier device controlling a temperature of the wavelength converting layer; and a clad portion joined with the flat face of the wavelength converting layer and provided between the wavelength converting layer and the Peltier device. The pump light, the idler light and the signal light satisfies a phase matching condition of the following formula (1). In the formula (1), "np" represents a refractive index of the wavelength converting layer with respect to the pump light, "rp" represents a wavelength of the pump light, "ns" represents a refractive index of the wavelength converting layer with respect to the signal light, "λs" represents a wavelength of the signal light, "ni" represents a refractive index of the wavelength converting layer with respect to the idler light, "λi" represent a wavelength of the idler light, and "Λ" represents a period of inversion of the crystal orientation.

$$(np/\lambda p)=(ns/\lambda s)+(ni/\lambda i)+(1/\Lambda) \quad (1)$$

As described above, according to wavelength converting devices utilizing bulk devices composed of semiconductors such as GaAs, it is possible to provide a core having a flat surface so that it is potentially expected a higher output power. However, the inventors tried to apply a structure of controlling a temperature of such bulk device of GaAs to realize wavelength-tunable device, it is observed an increase of spectrum line width and reduction of output power. Its Industrial applicability is thus proved to difficult.

The inventors have studied the cause of the increase of the spectrum line width and reduction of output power in such structure of controlling the temperature of the bulk device of GaAs for realizing the wavelength-tunable device. This kind of study has not been carried out and the cause has not been known.

The phase matching wavelength of the idler light emitted from the GaAs bulk device is sensitive with respect to its temperature and has a temperature dependency of 5 nm/° C. However, the temperature control of the bulk device is carried out precisely. It has been thus considered that an error of the phase matching wavelength is small. It is, however, actually observed an increase of the spectrum line width. In the process of studying the cause further, temperature distribution was observed within the bulk device when the temperature of a Peltier device mounted on a bottom face of the bulk device is changed. Particularly when such temperature distribution was generated in the direction of thickness of the bulk device, the phase matching wavelengths of the generated idler light are slightly deviated in the direction of thickness. It was speculated that such deviation provided the widening of the spectrum line width and the reduction of the output power.

For solving the problem described above, it was tried to make the thickness of a substrate of a non-linear optical semiconductor crystal to 50 μm or smaller to reduce the temperature distribution in the direction of the thickness. That is, a semiconductor thin plate having a thickness of 50 μm or smaller is mounted on a Peltier device used for the temperature control, and the pump light is input into the thin plate. It was, however, found that a spot size of the idler light in the direction of thickness becomes comparable with the thickness of the substrate itself, so that the light is absorbed in a metal plate forming the Peltier device and the propagation loss of the light becomes larger.

Thus, in such wavelength converting device utilizing a non-linear optical semiconductor crystal in which a Peltier device is used to control the temperature to oscillate the idler light in wavelength tunable manner, the inventors have tried to make the thickness of the wavelength converting layer to 50 μm or smaller and to provide a layer functioning as a clad between the Peltier device and wavelength converting device to prevent the absorption of light into the Peltier device. As a result, it is found that the reduction of the propagation loss of light and the increase of the spectrum line width can be prevented. The present invention is thus successfully made.

BRIEF DESCRIPTION OF THE DRAWINGS

FIGS. 6 (a) and (b) are views each schematically showing light sources for generating infrared rays, respectively.

EMBODIMENTS OF THE INVENTION

Figure 3:
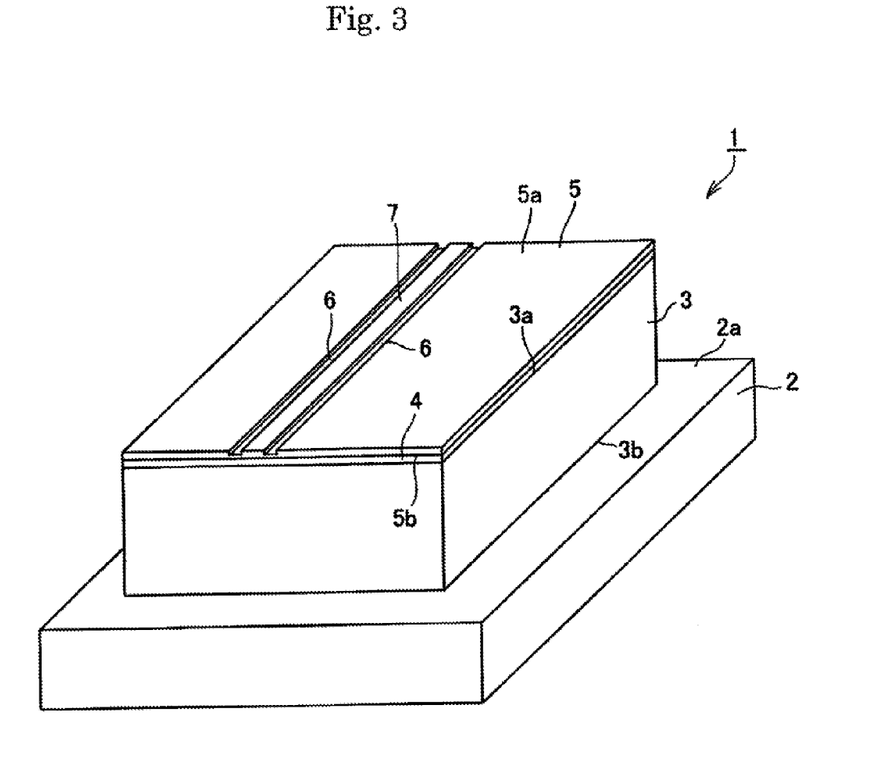
FIG. 3 is a perspective view schematically showing a wavelength converting device 1 according to the present invention.
Figure 4:
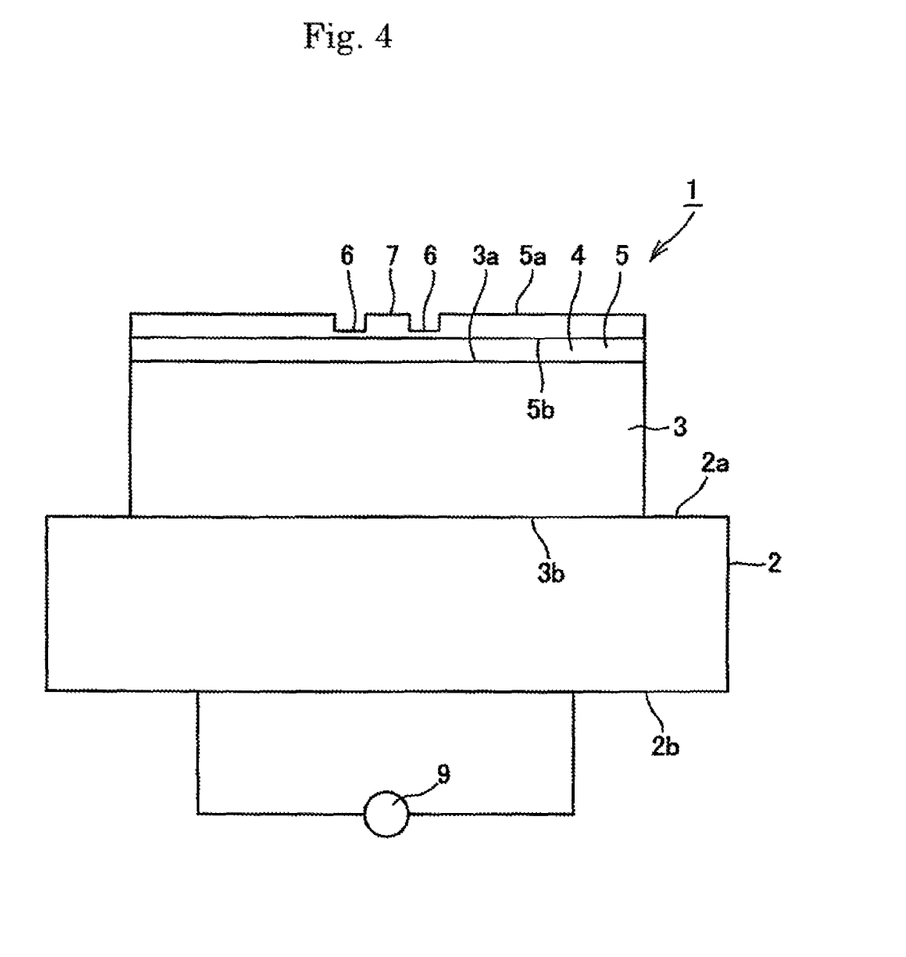
FIG. 4 is a front view showing the wavelength converting device 1 of FIG. 3.

FIGS. 3 and 4 show a wavelength converting device 1 according to an embodiment of the present invention.

A Peltier device 2 is driven by a control system 9 to precisely control a temperature at its temperature control surface 2a. Construction of the Peltier device itself is well known and its detailed description is omitted. The Peltier device has a bottom face 2b which may be mounted on a substrate not shown. The temperature control surface of the Peltier device is made of a material having a high thermal conductivity such as a metal.

According to the present embodiment, a supporting body 3 is mounted on the temperature control surface 2a of the Peltier device 2. The bottom face 2b of the supporting body 3 is mounted on the temperature control surface 2a of the Peltier device 2, and a main face 5b of a wavelength converting layer 5 is joined with a joining face 3a of the supporting body 3 through a joining layer 4. The main face 5b is made flat. A, ridge groove 6 is formed in the side of an upper face 5a of the wavelength converting layer 5, and a ridge type optical waveguide 7 is formed therebetween. Further, an inversion structure of crystal orientation is formed in the wavelength converting layer so that its period of inversion is Λ viewed in the direction of propagating light in the ridge type optical waveguide.

Figure 5:
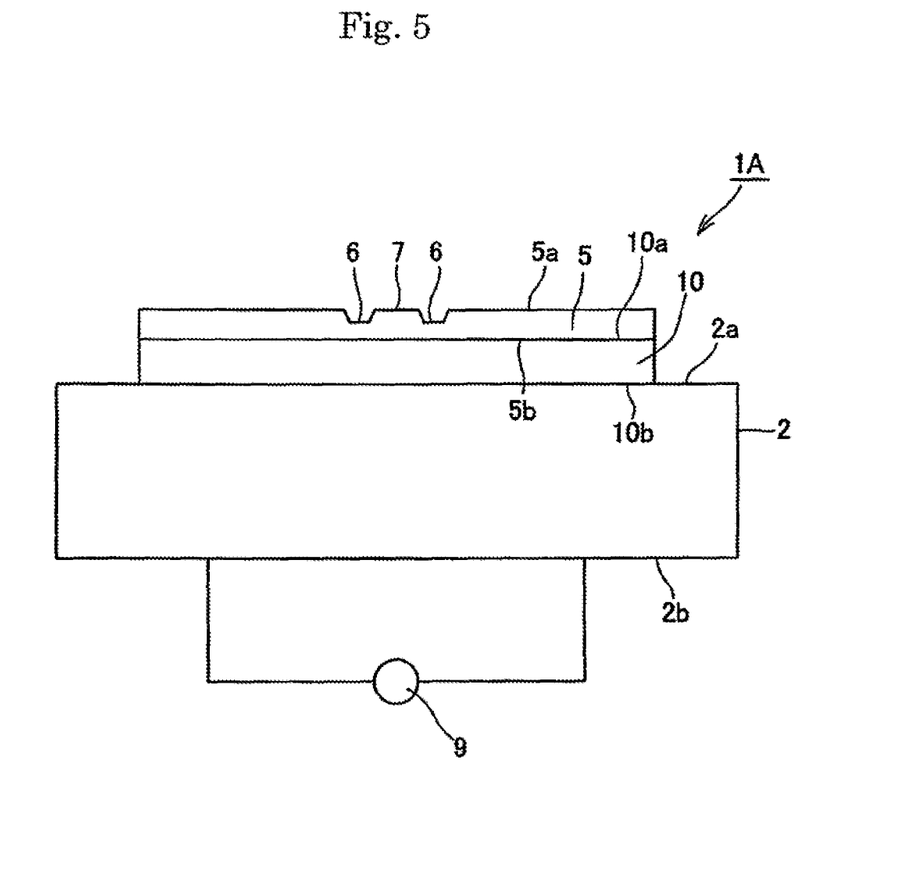
FIG. 5 is a front view schematically showing a wavelength converting device 1A according to another embodiment of the present invention.

FIG. 5 shows a wavelength converting device 1A according to another embodiment of the present invention.

The Peltier device 2 is driven by a control system 2 so that the temperature at the temperature control surface 2a can be precisely controlled.

According to the present example, a bottom face 10b of a clad body 10 is mounted on the temperature control surface 2a of the Peltier device 2, and the wavelength converting layer 5 is directly joined with the upper face 10a of the clad body 10. The refractive index of the clad body 10 is made lower than that of the wavelength converting layer 5. The construction of the wavelength converting layer itself is same as that shown in FIGS. 3 and 4.

FIGS. 6(a) and 6(b) are diagrams schematically showing systems for generating infrared rays, respectively.

According to the example shown in FIG. 6(a), it is shown a generating system of so-called single path (OPG) type. A pump light λp is generated and made incident into the device from a light source 20 of the pump light as an arrow. According to the present example, an idler light λi and a signal light λs are generated based on parametric oscillation. An optical filter 21 is used to cut the signal light and to transmit the targeted idler light λi for the subsequent utilization as a light source.

According to the example of FIG. 6(b), a generating system of so-called resonator type (OPO type) is shown. A pump light λp is generated from a light source 20 of for the pump light as an arrow and then made incident into the device. According to the present example, an idler light λi and signal light λs are generated based on parametric oscillation. A pair of resonator mirrors 11 are utilized to transmit the targeted idler light λi for the subsequent use as a light source.

The pump light means a main energy source for generating the idler light in the structure of crystal orientation inversion. The wavelength of the pump light is determined by the phase matching condition, which is determined by the wavelengths of the targeted idler light and signal light and the temperature of the wavelength converting layer.

The spectrum line width described above means a total of line widths of the pump and signal lights theoretically. Actually, however, the spectrum line width is a product of the QPM phase matching wavelength characteristics (tolerance) and the spectrum line width derived from the light source used. The product is thus smaller than the theoretical spectrum line width described above. It is thus possible to attain 10 GHz or lower required according to a specification by utilizing a light source whose line widths of the pump and signal lights are 5 GHz or lower. Specifically, it is preferred to utilize a laser of external resonator type such as DFB or FBG laser.

The non-linear semiconductor optical crystal forming the wavelength converting layer is composed of a semiconductor composed of a crystal having non-linear optical characteristics. It is preferably a single crystal. More specifically, the non-linear optical crystal may preferably have a non-linear optical constant of 30 pm/V or higher and a transmitting wavelength range of at least 5 μm to 10 μm, and preferably be one or more semiconductor(s) selected from the group consisting of GaAs, ZnSe, GaP, InP and InSb.

By reducing the thickness of the wavelength converting layer to 50 μm or smaller, it is possible to make the wavelength of the generated idler light tunable by the temperature control and, at the same time, to make the spectrum line width small. On the viewpoint, the thickness of the wavelength converting layer may preferably be 30 μm or smaller and more preferably be 20 μm or smaller. Further, although the lower limit of the wavelength converting layer is not particularly limited on the viewpoint of the present invention, it may preferably be 3 μm or larger on the viewpoint of further improving the power of the idler light.

It is provided in the wavelength converting layer the structure of inverted crystal orientation in which the crystal orientation is inverted at a predetermined period. For example in a substrate material of FIG. 7, portions 13a and 13b, whose crystal orientations are opposite with each other, are alternately provided at a predetermined period in a semiconductor substrate material 12. Preferably, the main face of the substrate material 12 is polished to form the wavelength converting layer.

The main face 5b of the wavelength converting layer 5 is made flat face, and the flat main face 5b is joined to a joining layer or clad body functioning as a clad. According to such structure, different from a device whose crystal orientation inversion structure and core are formed by a semiconductor process, it is possible to prevent steps due to the inversion of the crystal orientation in the core. It is thus possible to improve the generating efficiency of the idler light on such fundamental viewpoint.

Figure 7:
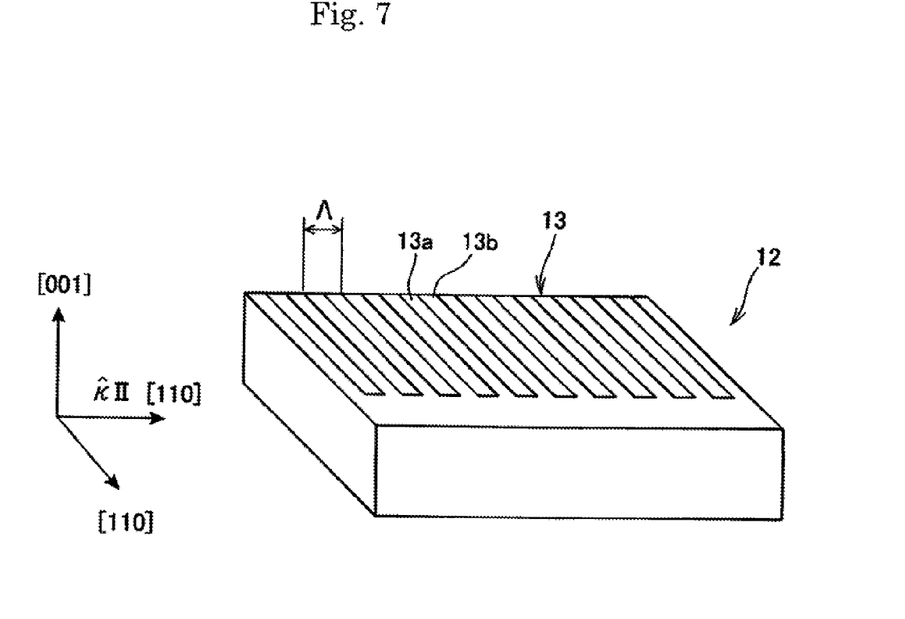
FIG. 7 is a diagram showing surface orientation of a substrate material 12 used for producing a wavelength converting layer according to an embodiment.

The flat main face of the wavelength converting layer can be formed by processing the material 7 as shown in FIG. 7 by, for example, mechanical processing such as polishing, grinding or the like. In this case, the center line average surface roughness Ra of the flat main face may preferably 100 angstrom or lower. Further, although it is preferred that whole of the main face is flat without any rough portion, it is permissible that hollows and/or protrusions may be formed in a part of the main face in the condition that the main face is flat except such part including the hollows and/or protrusions.

An over clad layer may be provided on an upper face of the wavelength converting layer, or the upper face of the wavelength converting layer may be directly exposed to the atmosphere. Further, although an under clad layer may be provided on a bottom face of the wavelength converting layer, it is preferred that the bottom face of the wavelength converting layer directly contacts the clad body.

The Peltier device for controlling the temperature of the wavelength converting layer may be a conventional device.

According to the present invention, the pump, idler and signal lights satisfy the phase matching condition of formula (1). Then, the Peltier device is heated to change the refractive index of the material of the wavelength converting layer with respect to each wave so that the phase matching condition is made tunable.

According to a preferred embodiment, the wavelength converting device includes a supporting body, and a joining layer joining the wavelength converting layer and supporting body functions as a clad.

According to the present embodiment, the refractive index of the material of the supporting body may be not more than, or not less than, the refractive index of the material of the wavelength converting layer. On the other hand, the ratio of the thermal expansion coefficient of the supporting body with respect to that (100 percent) of the non-linear optical crystal may preferably be 50 to 150 percent. Further, the material of the supporting body may preferably be a glass, a semiconductor or a ceramic substrate. The materials of the supporting body and wavelength converting layer may be the same. Further, such glass, semiconductor or ceramics may preferably be the following.

Soda lime glass, borosilicate glass, blue plate glass, white plate glass, aluminum gallium arsenide, alumina, quartz According to the present embodiment, the joining agent joining the wavelength converting layer and supporting body may preferably be made of a material having a dielectric constant lower than that of the wavelength converting layer. Further, it is preferred that the refractive index of the joining layer is lower than that of the wavelength converting layer, and the difference of the refractive indices may preferably be 0.3 or larger. Specifically, the refractive index of the joining layer may preferably be 2 or lower. Although specific examples of the joining agent is not particularly limited, an epoxy series resin adhesive, a thermosetting type resin adhesive, ultraviolet curable type resin adhesive, and Alon Ceramics C (Trade Name, supplied by Toa Gosei Co. LTD.) (thermal expansion coefficient of $13 \times 10^{-6}$/K) may be listed.

Although the thickness of the joining layer is not particularly limited, on the viewpoint of preventing the absorption of light by the Peltier device, the thickness of the joining layer may preferably be 0.1 μm or larger and more preferably be 0.5 μm or larger. Further, on the viewpoint of preventing the temperature distribution in the wavelength converting layer, the thickness of the joining layer may preferably be 3 μm or smaller and more preferably be 1.5 μm or smaller.

Further, in the case that the refractive index of the supporting body is lower than that of the wavelength converting layer and the joining layer is thin, an upper part of the supporting body functions as a clad together with the joining layer. For example, in the case that the supporting body is made of a glass or a ceramics, the refractive index of the supporting body is made lower than that of the wavelength converting layer so that the supporting body functions as a clad together with the joining layer. According to this embodiment, it is preferred that the refractive index of the material of the supporting body is different from that of the wavelength converting layer preferably by 0.5 or larger and more preferably by 1 or larger. More specifically, the refractive index of the material of the supporting body may preferably be 2.5 or lower.

Further, according to a preferred embodiment, the clad body is directly joined with the wavelength converting layer and the clad body is made of a material having a refractive index lower than that of the non-linear optical crystal. According to this embodiment, the difference of the materials of the clad body and the wavelength converting layer may preferably be 0.1 or larger and more preferably be 0.5 or larger. For example, in the case that the wavelength converting layer is made of GaAs, the refractive index of the material of the clad body may preferably be 3.4 or lower.

The material of such clad body may preferably be aluminum gallium arsenide, alumina or quartz.

Further, on the viewpoint of reducing the absorption of light by the Peltier device, the thickness of the clad body may preferably be 50 μm or larger and more preferably be 100 μm or larger. Further, on the viewpoint of reducing the temperature distribution in the wavelength converting layer, the thickness of the clad body may preferably be 500 μm or smaller and more preferably be 300 μm or smaller.

According to a preferred embodiment, the ridge type optical waveguide is formed in the wavelength converting layer so as to improve the output power of the idler light. The ridge optical waveguides is, however, not indispensable and may be replaced with another type waveguide.

According to a preferred embodiment, the pump light is irradiated into the wavelength converting layer to generate the idler and signal lights based on parametric generation. According to another embodiment, the pump and idler lights are made incident into the wavelength converting layer to generate the idler light based on difference frequency generation. Such generating methods themselves are known.

According to the device of the present invention, the pump light from the laser light source may be made incident directly into each waveguide. In this case, the laser light source may be directly but-jointed, or connected through a lens system, with the waveguide. Further, the pump light from the laser light source may be transmitted through an optical transmitting member such as an optical fiber and ferule. In this case, the end face of the optical transmitting member may be but-jointed, or connected through a lens system, with the waveguide.

EXAMPLES

Inventive Example 1

Figure 6:
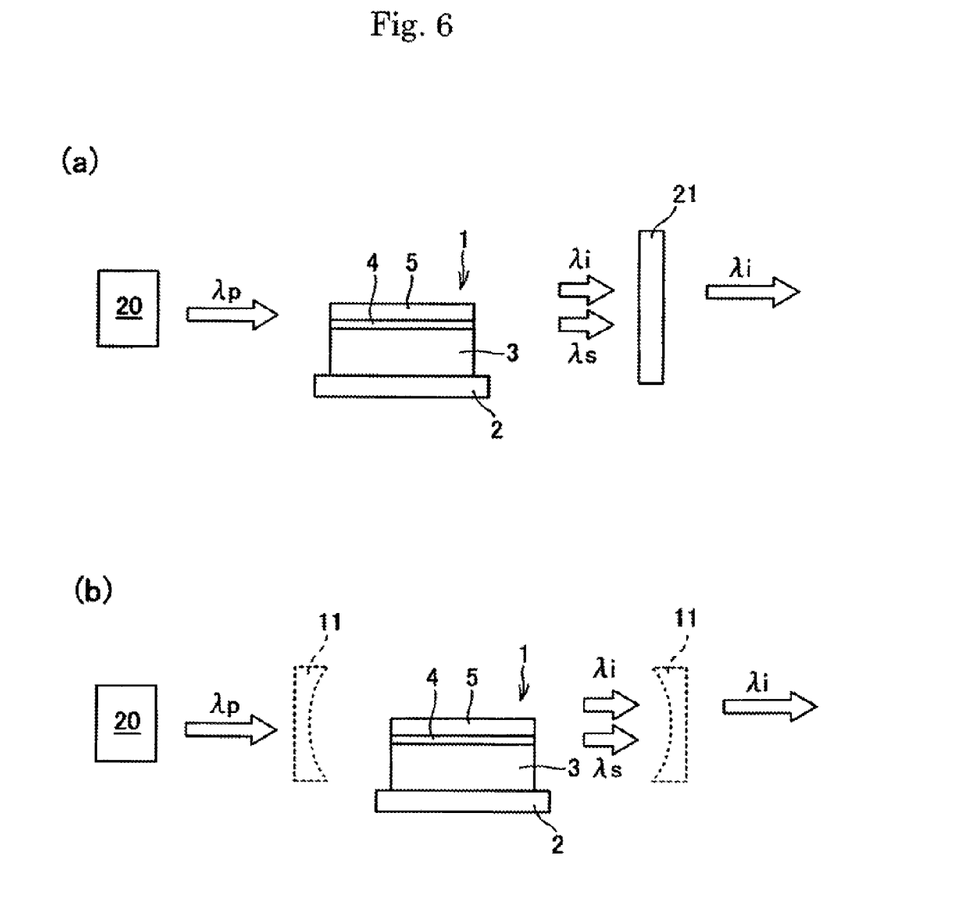

It was produced the wavelength converting device described referring to FIGS. 3 and 4, and it was then assembled the resonator-type infrared ray generating device described referring to FIG. 6 (*b*).

First, main physical properties of GaAs are shown below.
Density: 5.316 g/cm$^3$
Melting point: 1238° C.
Thermal Expansion coefficient: $6.86 \times 10^{-6}$/K at 300° C.
Thermal Conduction: 55 W/m·K
Dielectric constant: 11.53, 10.10 ($\in 0, \in \infty$)
Refractive Index: 3.3 to 3.7

Specifically, as shown in FIG. 7, it was prepared a 2-inch OP-GaAs wafer 12 having an inversion period Λ of 58 μm. The wafer was then adhered onto a glass wafer 2 having a thermal expansion coefficient of 7 ppm/° C. and a thickness of 0.5 mm through an adhesive layer 4 having a refractive index of 1.9 (made of Cardo polymer). The thickness of the adhesive layer was made 0.5 μm. Next, the thus adhered OP-GaAs wafer was then adhered onto a surface plate and the GaAs wafer side was polished to a thickness of 10 μm. Thereafter, the adhered and polished body was cut by means of a dicing saw to obtain a chip having a length of 10 mm and a width of 2 mm. Both end faces of the chip were then subjected to optical polishing. The thus obtained OP-GaAs chip after the polishing of the end faces was mounted on a Peltier device 2 as shown in FIGS. 3, 4 and 6(*a*) to obtain the device 1.

Infrared ray (pump light) generated by a DFB laser having a wavelength of 1874 nm, an output power of 3 mW and a spectrum line width of 1 GHz was condensed with a lens and then input into the GaAs device. The orientation of the polarization of the pump light was made a crystal axis of (001). The temperature of the chip was made 22° C. and mirrors 11 were positioned on both sides of the end faces of the chip to form a resonator (SRO: Single Reflection Oscillator) with respect to the signal light (wavelength of 2517 nm). It was thereby generated the idler light having a wavelength of 7333 nm in the orientation of the polarization of the crystal axis of (110). The output power was 200 µW and the spectrum line width was 2 GHz.

Figure 8:
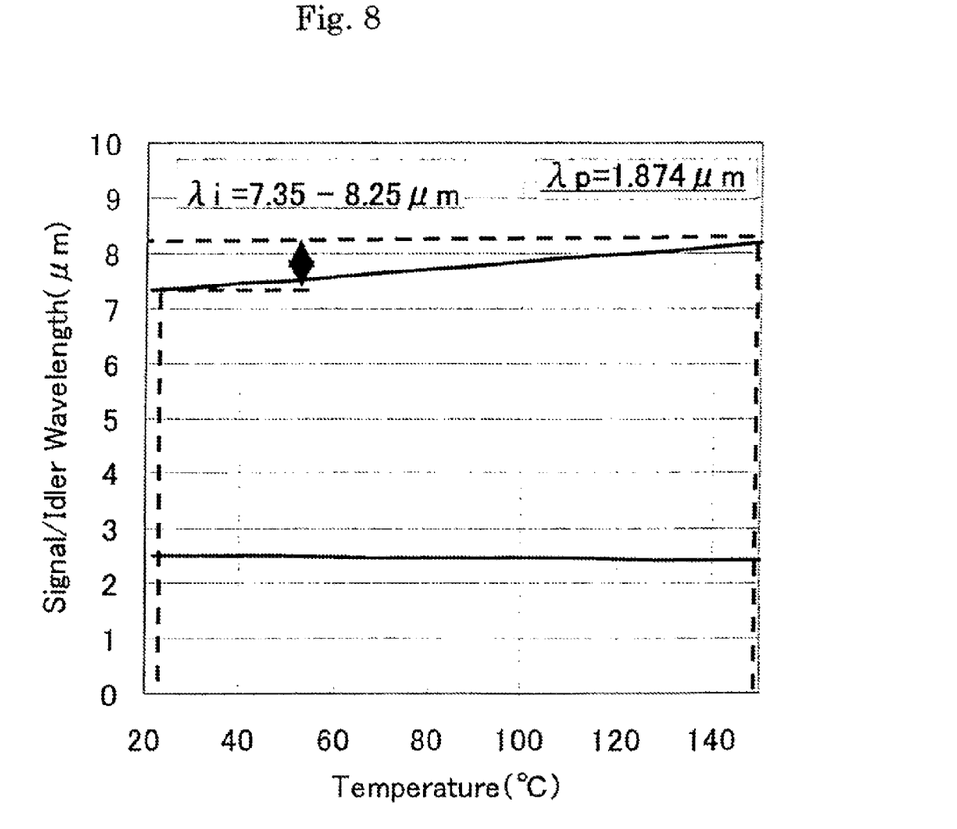
FIG. 8 is a graph showing relationship of signal light, idler light and temperature.

Further, the temperature of the Peltier device was elevated to 150° C. and it was thus proved that the wavelength of the idler light was gradually raised and the wavelength can be tuned up to 8198 nm (Refer to FIG. 8).

Further, table 1 shows specifications of the device according to the present example.

It was proved that the deviation of the output of the idler light was within a range of 30 percent in all wavelength ranges. Further, the spectrum line width was proved to be 2 GHz or smaller.

TABLE 1

|  | Specification | Specific Example 2 |
|---|---|---|
| Central Wavelength (Frequency) | 6 to 10 µm (30 to 50 THz) | 7.75 µm |
| Tunable range | Min ± 0.35 µm (min. ± 2 THz) | ±0.4 µm |

Inventive Example 2

The device 1 shown in FIGS. 3 and 4 was produced according to the same procedure as the Inventive Example 1.

Then, as shown in FIG. 6(*a*), the single path type infrared ray generating system was assembled.

Specifically, the OP-GaAs device with the end faces polished was mounted on the Peltier device as shown in FIG. 6(*a*) and a DFB laser 20 was operated at a wavelength of 1874 nm, 3 nsec and 10 µJ. Near-infrared rays (pump light) having a spectrum line width of 1 GHz was condensed with a lens and then input into the GaAs device. The orientation of the polarization of the pump light was in a crystal axis of (110). It was thus generated the idler light of a wavelength of 7333 nm whose orientation of polarization was in a crystal axis of (001). The output power was 200 nJ and spectrum line width was 2 GHz.

Further, the temperature of the Peltier device was elevated to 150° C. and it was thus proved that the wavelength of the idler light was gradually raised and the wavelength can be tuned up to 8198 nm. It was proved that the deviation of the output of the idler light was within a range of 30 percent in all wavelength ranges. Further, the spectrum line width was proved to be 2 GHz or smaller.

Comparative Example 1

As shown in FIG. 7, a 2-inch GaAs wafer having an inversion period Λ of λ of 58 µm and a thickness of 0.5 mm was cut with a dicing saw to obtain a chip having a length of 10 mm and a width of 2 mm. The end faces of the chip were then subjected to optical polishing.

The thus obtained OP-GaAs device with the end faces polished was mounted on the Peltier device as the Inventive Example 1. Near-infrared rays (pump light) having a wavelength of 1874 nm, an output of 3 mW and a spectrum line width of 1 GHz from a DFB laser was condensed with a lens and input into the GaAs device. The orientation of the polarization of the pump light was in a crystal axis of (110). The temperature of the chip was adjusted at 22° C. and mirrors were positioned on both sides of the end faces of the chip, respectively, to provide a resonator (SRO: Single Reflection Oscillator) with respect to the signal light (wavelength of 2517 nm).

Then, the idler light of a wavelength of 7333 nm was generated in the orientation of polarization along a crystal axis of (001). The output and spectrum line width of the idler light were proved to be 200 nW and 15 GHz, respectively. The conversion rate was proved to be 1/1000 of that of the Inventive Example 1.

Comparative Example 2 and Inventive Examples 3 and 4

Figure 9:
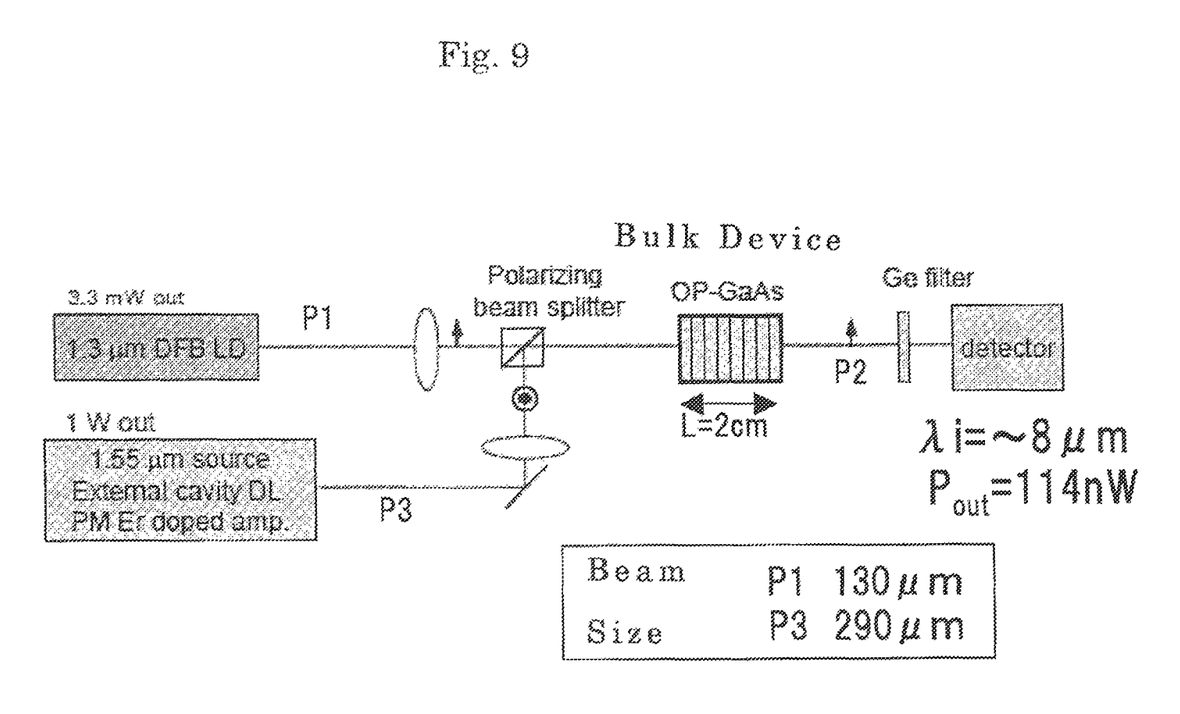
FIG. 9 shows an example of construction of a light emitting system used in examples.

FIG. 9 shows a system of generating infrared rays disclosed in the Non-Patent Reference 3 by Stanford University. Pump light P1 of a wavelength of 1.3 µm and signal light P3 of a wavelength of 1.55 µm were made incident into the wavelength converting device having the GaAs bulk same as the Comparative Example 1. The thus generated idler light was then passed through a Ge filter and outputted. The wavelength λi of the idler light was about 8 µm and output power was 114 nW.

On the other hand, the GaAs bulk device of the comparative Example 2 was replaced with the device 1 used in the above described Inventive Example 1. The output power P2 and conversion rate η of the thus obtained idler light were shown in table 2, in which "L" indicates the length of the device.

TABLE 2

|  | P1 (W) | P3 (W) | L (cm) | η (%/Wcm²) | P2 |
|---|---|---|---|---|---|
| Comparative Example 2 | 0.0033 | 1 | 2 | 8.6 × 10⁻⁴ | 114 nW |
| Inventive Example 3 | 0.05 | 0.05 | 2 | 0.7 Waveguide | 70 µW |
| Inventive Example 4 | 0.1 | 0.1 | 4 | Type | 1 mW |

As described above, it was proved that the output power of the idler light can be considerably improved with respect to the prior type infrared ray generating system, by applying the device of the present invention.

Inventive Example 5

It was tried to carry out difference frequency generation by using the device 1 according to the same procedure as the Inventive Example 1, except that the inversion period Λ was made 25 µm. The device was then mounted on the Peltier device.

Near-infrared rays (pump light) from a DFB laser operated at a wavelength of 1300 nm, an output power of 50 mW and a spectrum line width of 1 GHz was condensed with a lens and then input into the GaAs device. The orientation of the polarization of the pump light was in a crystal axis of (100). At the same time, near-infrared rays (signal light) from a DFB laser operated at a wavelength of 1540 to 1570 nm, an output power of 50 mW and a spectrum line width of 1 GHz was condensed with a lens and then input into the GaAs device. The orientation of the polarization of the signal light was in a crystal axis of (001).

The temperature of the chip was made 22° C. to provide a single-path type infrared ray generating system. Idler light having a wavelength of 7500 nm was then generated in the orientation of polarization in a crystal axis of (001). The output power and spectrum line widths of the idler light were proved to be 70 μW and 2 GHz, respectively.

Figure 10:
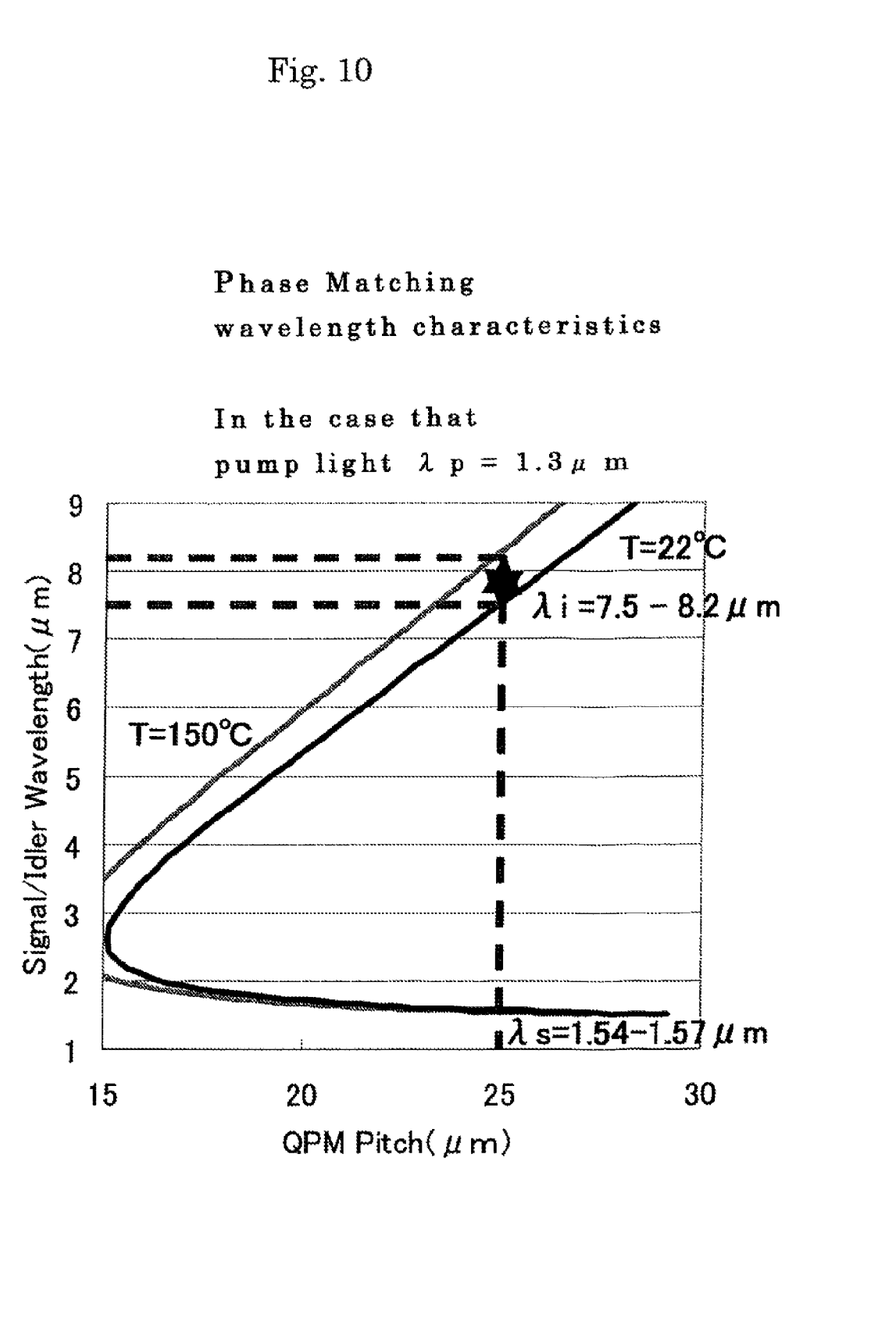
FIG. 10 is a graph showing relationship of a pitch of QPM, signal light and idler light.

Further, as the temperature of the Peltier device was elevated to 150° C., it was observed that the wavelength of the idler light was gradually raised to prove that the wavelength can be tunable up to 8200 nm (see FIG. 10).

FIG. 3 shows specifications of the device of the present example.

As a result, the deviation of the output power of the idler light was proved to be 30 percent or smaller within all frequency ranges. Further, the spectrum line width was proved to be 2 GHz or smaller.

TABLE 3

|  | Specification | Specific Example 1 |
|---|---|---|
| Central Wavelength (Frequency) | 6 to 10 μm (30 to 50 THz) | 7.85 μm |
| Tunable range | Min ± 0.35 μm (min. ± 02 THz) | ±0.35 μm |

The invention claimed is:

1. A wavelength converting device generating an idler light having a wavelength of 5 to 10 μm from a pump light, said wavelength of said idler light being longer than that of said pump light, said wavelength converting device comprising:
a wavelength converting layer comprising a semiconductor non-linear optical crystal and having a thickness of 50 μm or smaller, said wavelength converting layer comprising at least one flat main face and a crystal orientation inversion structure wherein crystal orientation of said optical crystal is inverted at a predetermined period;
a Peltier device controlling a temperature of said wavelength converting layer; and
a clad portion joined with said flat main face of said wavelength converting layer and provided between said wavelength converting layer and said Peltier device;
wherein said pump light, said idler light and said signal light satisfies a phase matching condition of the following formula (1), in the conditions that "np" represents a refractive index of said wavelength converting layer with respect to said pump light, "λp" represents a wavelength of said pump light, "ns" represents a refractive index of said wavelength converting layer with respect to said signal light, "λs" represents a wavelength of said signal light, "ni" represents a refractive index of said wavelength converting layer with respect to said idler light, "λi" represents a wavelength of said idler light, "λi" represents a wavelength of said idler light, and "Λ" represents a period of inversion of said crystal orientation:

$$(np/\lambda p)=(ns/\lambda s)+(ni/\lambda i)+(1/\Lambda) \qquad \text{formula (1).}$$

2. The wavelength converting device of claim 1, wherein said semiconductor non-linear optical crystal is selected from the group consisting of GaAs, ZnSe, GaP, InP and InSb.

3. The wavelength converting device of claim 1, further comprising a supporting body and a joining layer joining said wavelength converting layer and said supporting body, wherein said joining layer functions as said clad portion.

4. The wavelength converting device of claim 3, wherein a ratio of a thermal expansion coefficient of a material of said supporting body with respect to that of said semiconductor non-linear optical crystal is 50 to 150 percent, and
wherein said material of said supporting body comprises a glass, a semiconductor or a ceramics.

5. The wavelength converting device of claim 1, wherein said clad portion is directly joined with said wavelength converting layer, and wherein said clad portion comprises a substrate made of a material having a refractive index lower than that of said semiconductor non-linear optical crystal.

6. The wavelength converting device of claim 1, further comprising a ridge type optical waveguide provided in said wavelength converting layer.

7. The wavelength converting device of claim 1, wherein a temperature of said wavelength converting layer is controlled by said Peltier device to control said wavelength of said idler light.

8. The wavelength converting device of claim 1, wherein said pump light is made incident into said wavelength converting layer to generate said idler light and said signal light based on parametric generation.

9. The wavelength converting device of claim 1, wherein said pump light and signal light are made incident into said wavelength converting layer to generate said idler light based on difference frequency generation.

10. A light source generating an infrared ray, comprising the wavelength converting device of claim 1 and a distributed feedback laser generating said pump light.

* * * * *